(12) United States Patent
Adamchuck et al.

(10) Patent No.: US 6,356,830 B1
(45) Date of Patent: Mar. 12, 2002

(54) SYSTEM AND METHOD FOR AUTOMATED MEASUREMENT OF SOIL PH

(75) Inventors: Viacheslav I. Adamchuck, Kyiv (UA); Mark T. Morgan, Lafayette, IN (US); Daniel R. Ess, Columbia, MO (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/372,351

(22) Filed: Aug. 11, 1999

Related U.S. Application Data

(60) Provisional application No. 60/096,172, filed on Aug. 11, 1998.

(51) Int. Cl.[7] .............. G06F 19/00; G06G 7/00; G01C 21/00; A01B 13/08; A01C 23/00
(52) U.S. Cl. .............. 701/50; 436/163; 701/50; 701/118; 701/208; 701/213; 701/215; 172/699; 172/720; 111/118; 111/200; 111/52; 422/68.1
(58) Field of Search .............. 422/68.1; 436/163; 172/699, 720, 724; 701/50, 118, 208, 215, 213; 111/118, 200, 52

(56) References Cited

U.S. PATENT DOCUMENTS

| | | | | |
|---|---|---|---|---|
| 4,806,850 A | * | 2/1989 | Saumade et al. | 324/71.1 |
| 5,673,637 A | * | 10/1997 | Colburn, Jr. et al. | 111/118 |
| 5,751,576 A | * | 5/1998 | Monson | 364/188 |
| 5,757,640 A | * | 5/1998 | Monson | 364/131 |
| 5,771,169 A | * | 6/1998 | Wendte | 364/420 |
| 5,870,686 A | * | 2/1999 | Monson et al. | 701/1 |
| 5,902,343 A | * | 5/1999 | Hale et al. | 701/50 |
| 5,938,709 A | * | 8/1999 | Hale et al. | 701/50 |
| 5,978,723 A | * | 9/1999 | Hale et al. | 701/50 |
| 5,961,573 A | * | 10/1999 | Hale et al. | 701/214 |
| 6,003,455 A | * | 12/1999 | Flamme et al. | 111/200 |
| 6,029,106 A | * | 2/2000 | Hale et al. | 701/50 |
| 6,061,618 A | * | 5/2000 | Hale et al. | 701/50 |
| 6,102,613 A | * | 8/2000 | Medico, Jr. et al. | 404/17 |
| 6,119,069 A | * | 9/2000 | McCauley | 702/5 |
| 6,119,531 A | * | 9/2000 | Wendte et al. | 73/863.52 |

* cited by examiner

*Primary Examiner*—Jill Warden
*Assistant Examiner*—B. R Gordon
(74) *Attorney, Agent, or Firm*—Woodard, Emhardt, Naughton, Moriarty & McNett Patent and Trademark Attorneys

(57) ABSTRACT

An apparatus for automatically measuring soil pH at a relatively large number of places in a field, and automatically creating a soil pH map by simultaneously measuring the position of the apparatus and storing the pH data in association with the location from which the corresponding soil sample was taken. The apparatus includes a wheeled chassis, a shank for exposing soil at a controlled depth, a sampling tray for collecting soil, a probe for measuring the pH of the soil, a water supply for cleaning the probe between measurements, a devise for measuring the location of the apparatus, and a computer for controlling the measurement cycle and recording the data.

12 Claims, 5 Drawing Sheets

SYSTEM AND METHOD FOR AUTOMATED MEASUREMENT OF SOIL PH

CROSS REFERENCE TO RELATED APPLICATIONS

The present application claims benefit under Title 35, United States Code, Section 119(e) of U.S. Provisional Patent Application Ser. No. 60/096,172, filed Aug. 11, 1998.

TECHNICAL FIELD OF THE INVENTION

The present invention relates to detecting the acidity or alkalinity of soil. More particularly, it relates to methods and devises for automatically collecting data on the acidity or alkalinity of soil at a number of places in a field.

BACKGROUND OF THE INVENTION

Site-specific farming, or precision farming, is used today in order to improve crop yields, lower costs, and to protect the environment, by treating different parts of a given field according to their specific conditions, instead of treating the entire field according to the average conditions throughout. In this way, for example, lime can be applied only to areas of a field which have overly acidic soil, which reduces the costs of materials and labor, and avoids excessively alkaline soil from unnecessary liming.

Typically, data on soil properties, including pH, are gathered by collecting a number of soil samples and analyzing them in a laboratory. The standard laboratory pH test for a single soil sample requires mixing equal masses of de-ionized water and soil, stirring vigorously for five to ten seconds, letting the mixture stand for ten to thirty minutes, and measuring the pH of the slurry using a calibrated pH meter. This process must be repeated for each sample. Furthermore, each sample must be individually packaged to keep it from being contaminated during transport from the field to the laboratory, and labeled or otherwise identified with the specific location from which it was collected.

Because of the difficulty and expense of collecting and analyzing samples in the field with laboratory analysis, the total number of samples that can feasibly be collected is limited. Consequently, the resolution of the data is limited, so that current methods generally produce values of soil properties for areas on the order of a hectare.

As will be appreciated by persons of ordinary skill in the art, soil pH may have significant variation within a field. Some fields have soil pH ranging from 5 to 8, with a coefficient of variation exceeding 10%. Combining soil samples over an area of 1 ha leads to a loss of information about spatial variability, and doubts exist about the accuracy of interpolated maps from grid soil sample data. Therefore, persons of ordinary skill in the art will recognize that the variation in soil pH over the area of a single grid can greatly exceed the experimental error in measuring soil pH. The accuracy with which processes such as liming, which are indicated based at least in part on soil pH, can be prescribed is restricted primarily by sampling density. Consequently, crop productivity as a whole is restricted by sampling density. Thus, there is an ongoing need to develop systems and methods to decrease the cost of soil sampling and to improve the resolution of soil property maps. The present invention is directed toward meeting this need.

SUMMARY OF THE INVENTION

The present invention relates to a method and apparatus for automatically measuring soil pH in the field. An apparatus is disclosed, suitable for a standard tractor to tow, which will automatically measure soil pH at a relatively large number of places throughout a field. Also disclosed is an apparatus for automatically measuring the soil pH at a relatively large number of places throughout a field, including a devise for simultaneously measuring the position of the apparatus, in order to automatically create a soil pH map.

In one form of the invention, an apparatus for automatically measuring the pH of soil at a relatively large number of places in the field is disclosed, comprising a chassis suitable for towing by a standard tractor; a plurality of wheels; a tank for holding water; a compressed air tank; at least one shank for exposing the soil at the desired sampling depth; at least one pH sensor, each including at least one probe; a probe assembly for each probe, including a sampling platform for collecting soil from pre-selected soil depths and bringing it into contact with the probe, an actuator for moving the sampling platform between an extended position in which a soil sample is collected and a retracted position in which the soil sample is in contact with the probe, and one or more nozzles connected by hoses to the tanks of water for cleaning the probe between measurements by directing water onto it; and an onboard computer for collecting and storing the data.

Another form of the invention includes an apparatus for automatically creating a map of the pH of soil in a field, comprising an apparatus for automatically measuring the pH of soil at a relatively large number of places in the field, and a sensor for continuously detecting the position of the apparatus to allow each pH measurement to be automatically recorded in conjunction with the location of the soil which was measured.

Another form of the invention includes a method for measuring the pH of the soil at a relatively large number of places throughout a field, comprising: providing an apparatus for automatically measuring the pH of soil at a relatively large number of places in the field, including a chassis suitable for towing by a standard tractor, a plurality of wheels, a tank for holding water, a compressed air tank, at least one shank for exposing soil at the desired sampling depth, at least one pH sensor, each including a probe, a probe assembly for each probe including a shank for controlling the location of the probe assembly relative to the surface of the ground, a sampling platform for collecting soil from pre-selected soil depths and bringing it into contact with the probe, an actuator for moving the sampling platform between an extended position in which a soil sample is collected and a retracted position in which the soil sample is in contact with the probe, and one or more nozzles connected to a reservoir of water for cleaning the probe between measurements by directing water onto it, and an onboard computer for collecting and storing the data; selecting a depth at which soil pH measurements will be made; selecting a speed corresponding to the desired distance between locations for pH measurements; and towing the chassis through the field at the selected speed to collect data for a number of places throughout it.

Another form of the invention includes a method for creating a relatively high resolution pH map for a field, comprising: providing an apparatus for automatically creating a map of the pH of soil in a field; selecting a depth at which soil pH measurements will be made; selecting a speed corresponding to the desired distance between locations for pH measurements; and towing the chassis through the field at the selected speed to collect data for a number of places throughout it.

One object of the present invention is to provide a unique apparatus for creating relatively high resolution pH maps.

Other objects and advantages of the present invention will be apparent from the following description.

DESCRIPTION OF THE PREFERRED EMBODIMENTS

Figure 1:
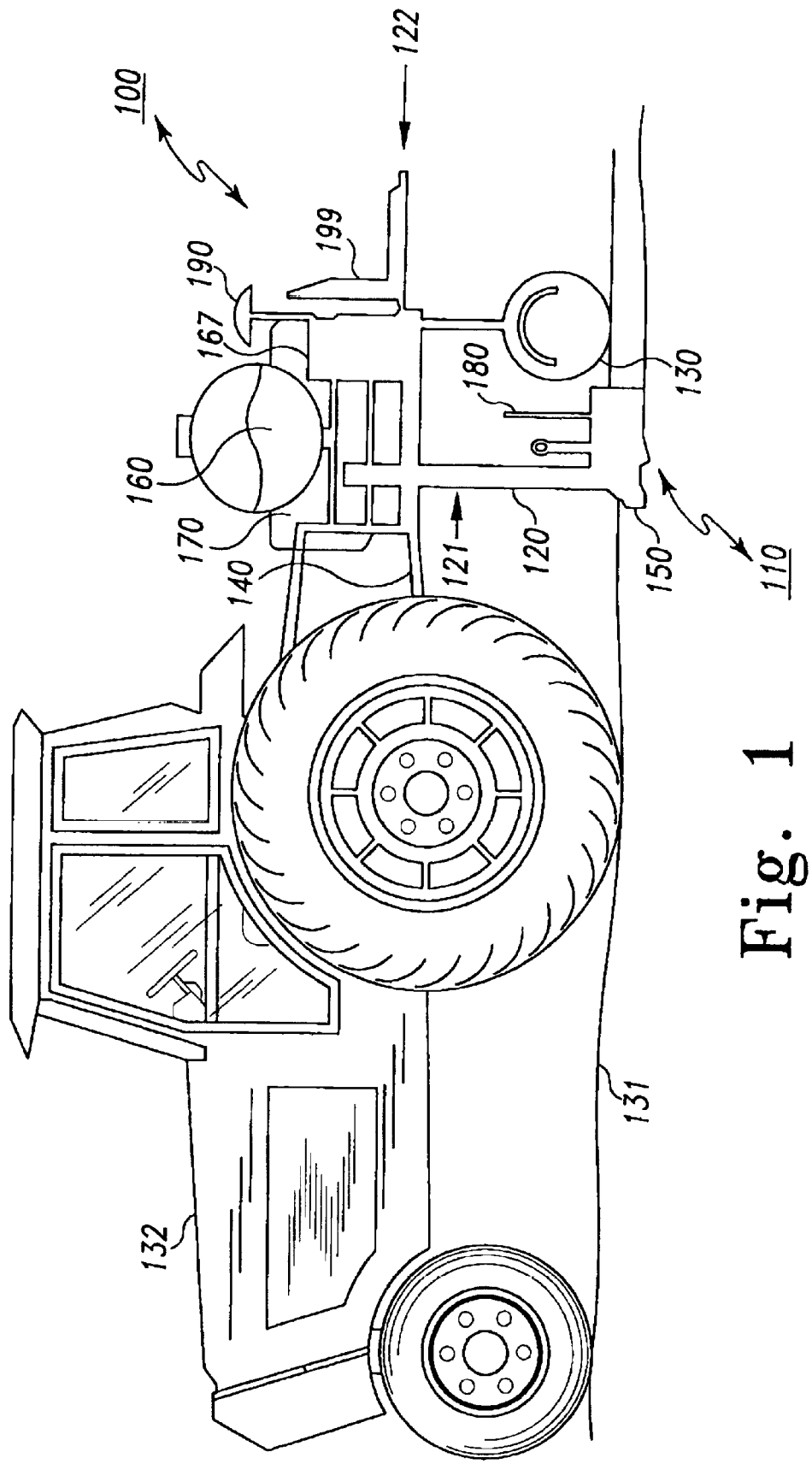
FIG. 1 is a side elevational view of an apparatus for automatic measurement of soil pH according to the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described processes, systems, or devices, and any further applications of the principles of the invention as described herein are contemplated as would normally occur to one skilled in the art to which the invention relates.

Figure 6:
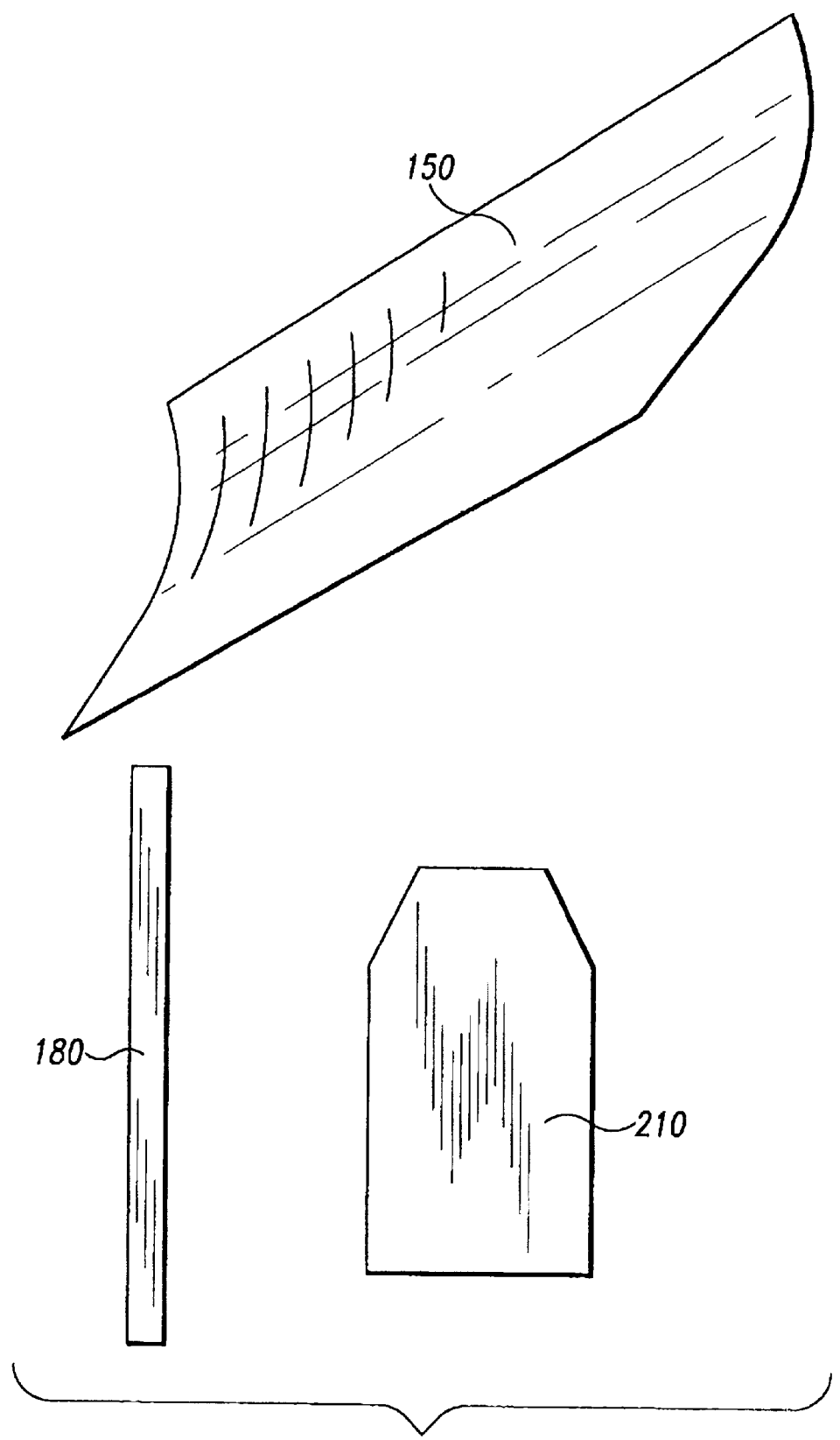
FIG. 6 is a plan view showing the relative positions of certain parts of the apparatus shown in FIG. 1.

Referring to FIG. 1, an apparatus 100 for automatically measuring the soil pH according to the present invention is shown. Apparatus 100 includes a probe assembly 110 affixed to a chassis 120. Chassis 120 has a forward side 121 and a rear side 122, corresponding to the direction in which apparatus 100 moves when collecting data. Chassis 120 is supported by one or more wheels 130, which are adjustably mounted thereto, so as to allow chassis 120 to be raised or lowered relative to the surface of the ground 131. A tow hitch 140 is affixed on the forward side 121 of chassis 120, so that the apparatus can be towed by a standard tractor 132 or other appropriate vehicle. A shank 150 is affixed to chassis 120 directing forward of probe assembly 110, and with the bottom edge of shank 150 positioned lower than the bottom of probe assembly 110 when the apparatus is not collecting data. A removable plate 180 is positioned parallel to the direction of travel, adjacent to the trailing edge of shank 150, and to the side of probe assembly 110. A top plan view of the shank 150/removable plate 180 arrangement is illustrated in FIG. 6.

A water tank 160 is connected by water hoses (shown as 165 in FIG. 2) to a water pump 167, which is in turn connected to nozzles (shown as 250 in FIG. 2) in probe assembly 110. In one embodiment, water pump 167 is a standard 12V water pump (such water pumps being commonly known in the art). A compressed air tank 170 is connected to an air cylinder (shown as 230 in FIG. 2) though air hoses 175. Preferably, water hoses 165 and air hoses 175 are affixed to chassis 120 at a number of places along chassis 120.

A location sensor 190 is affixed to chassis 120 or other convenient location. In one embodiment, location sensor 190 is a standard global positioning satellite (GPS) antenna.

A computer 199 is affixed to chassis 120, and is telemetrically connected to water pump 167, air cylinder 230, location sensor 190, and a probe (shown as 240 in FIG. 2), and is programmed automatically to record pH measurements made by probe 240 and location measurements made by location sensor 190, to correlate pH measurements with the location at which they are made, and to control water pump 190 and air cylinder 230, as further described below. In an alternative embodiment, water pump 190 and air cylinder 230 are controlled by a separate computer.

Figure 2:
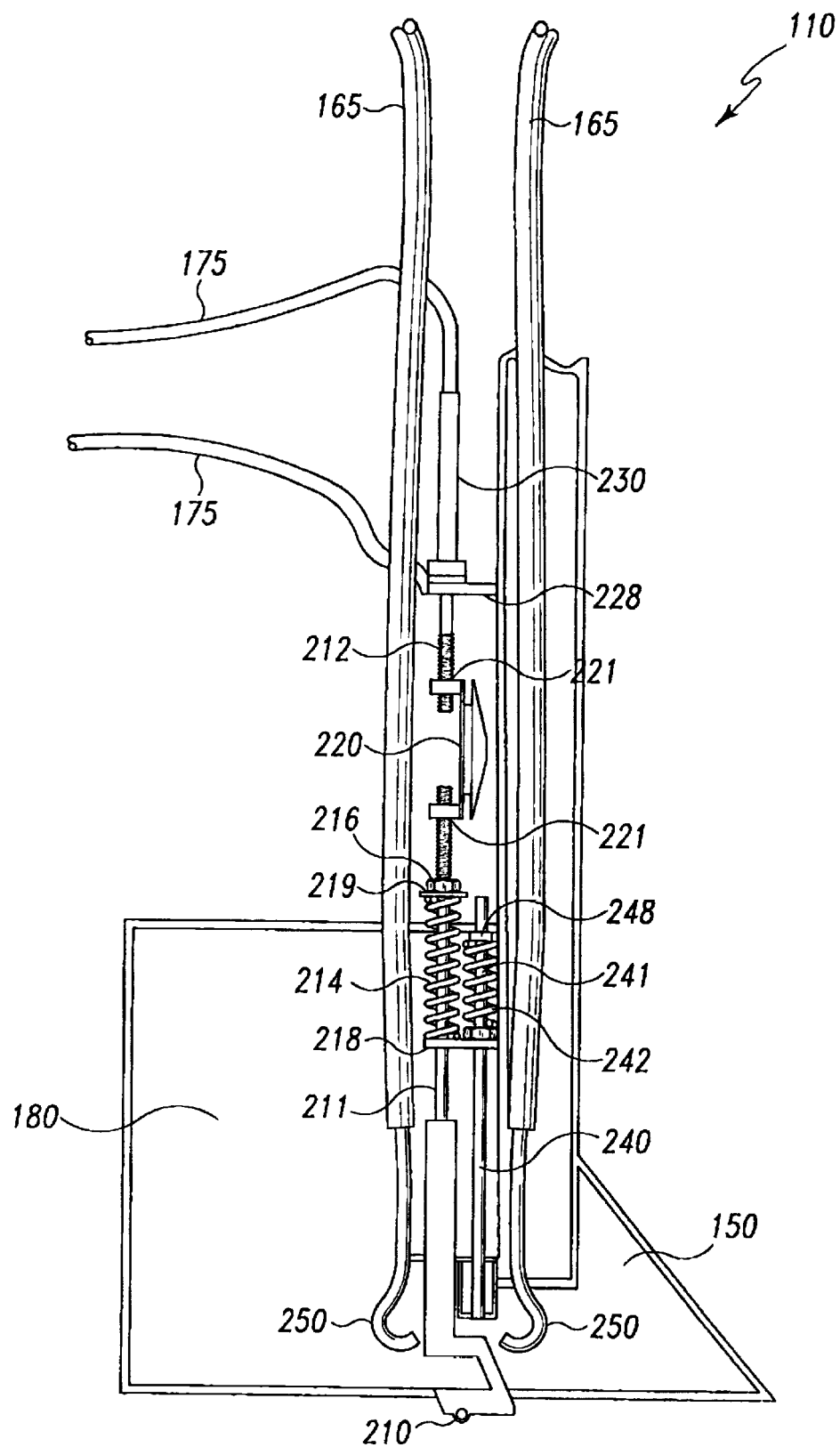
FIG. 2 is a side elevational view of further details of the probe assembly shown in FIG. 1.

Referring to FIG. 2, further details of probe assembly 110 for making periodic measurements of the pH of soil at a pre-selected depth is shown. The probe assembly 110 includes a sampling platform 210 affixed to a first shaft 211, which extends through a spring 214 and a mounting 218, discussed hereinafter. At least the top portion of first shaft 211 is threaded, and is engaged by a threaded nut 216. The bottom end of spring 214 abuts mounting 218, and the top end abuts a washer 219, which in turn abuts threaded nut 216. An adjustment piece 220 for adjusting the distance between the threaded nut 216 and the air cylinder 230 is provided, comprising two parallel portions, each having a threaded through-hole 221, and a perpendicular portion. Through-holes 221 are oppositely threaded, with the bottom hole threaded appropriately to engage the threads on the top end of first shaft 211. First shaft 211 and an second shaft 212 engage oppositely threaded through-holes 221, so that the distance between shafts 211 and 212 can be increased or decreased by rotating adjustment piece 220 about the axis of shafts 211 and 212. Second shaft 212 passes through mounting 228, discussed hereinafter. The end of shaft 212 opposite to adjustment piece 220 is affixed to air cylinder 230.

Air cylinder 230 is adapted to actuate second shaft 212 (i.e. move the shaft 212 away from air cylinder 230) when air pressure is applied by compressed air tank 170 through air hoses 175. The range of actuation is at least about 5 mm, and preferably does not exceed about 40 mm. Air cylinder 230 is affixed to mounting 228. In one embodiment, the air pressure required to cause air cylinder 230 to actuate shaft 212 is 250 kPa.

A probe 240 is affixed to the bottom end of a third shaft 241. At least the top portion of third shaft 241 is threaded. Third shaft 241 passes through a spring 242, mounting 218, and mounting 248. A threaded nut 246 engages the top portion of shaft 241, and abuts mounting 248. The top end of spring 242 abuts mounting 218, and the bottom end abuts mounting 218. When correctly positioned, probe 240 is just above sampling platform 210 in its retracted position.

Nozzles 250 are connected to hoses 165, and are directed toward probe 240, so that when water is pumped from tank 160, streams of water contact probe 240.

Probe assembly 110 is affixed to chassis 120 by mountings 218, 228, and 248. Mountings 218, 228 are affixed on chassis 120 sufficiently closely to place spring 214 in compression when sampling platform 210 is positioned at least below the bottom edge of shank 150 by turning adjustment piece 220. Mountings 218 and 248 are affixed to chassis 120 sufficiently far apart so as to place spring 242 in compression when probe 240 has been positioned at least as low as the lowest position in which it might be used to make measurements. This allows spring 242 to hold probe 240 in position against jostling of probe assembly 110 during motion. The position of probe 240 can be adjusted by turning threaded nut 246. In one embodiment, when spring 214 is in tension, it will return sampling platform 210 to the retracted position when air cylinder 230 is at rest (deactivated). When air pressure is applied to air cylinder 230, the compression in spring 214 is overcome, and sampling platform 210 is moved to the extended position. In another embodiment, spring 214 retains sampling platform 210 in an intermediate position when no air pressure is applied to air cylinder 230, wherein the bottom of sampling platform 210 is above the bottom edge of shank 150.

Figure 3:
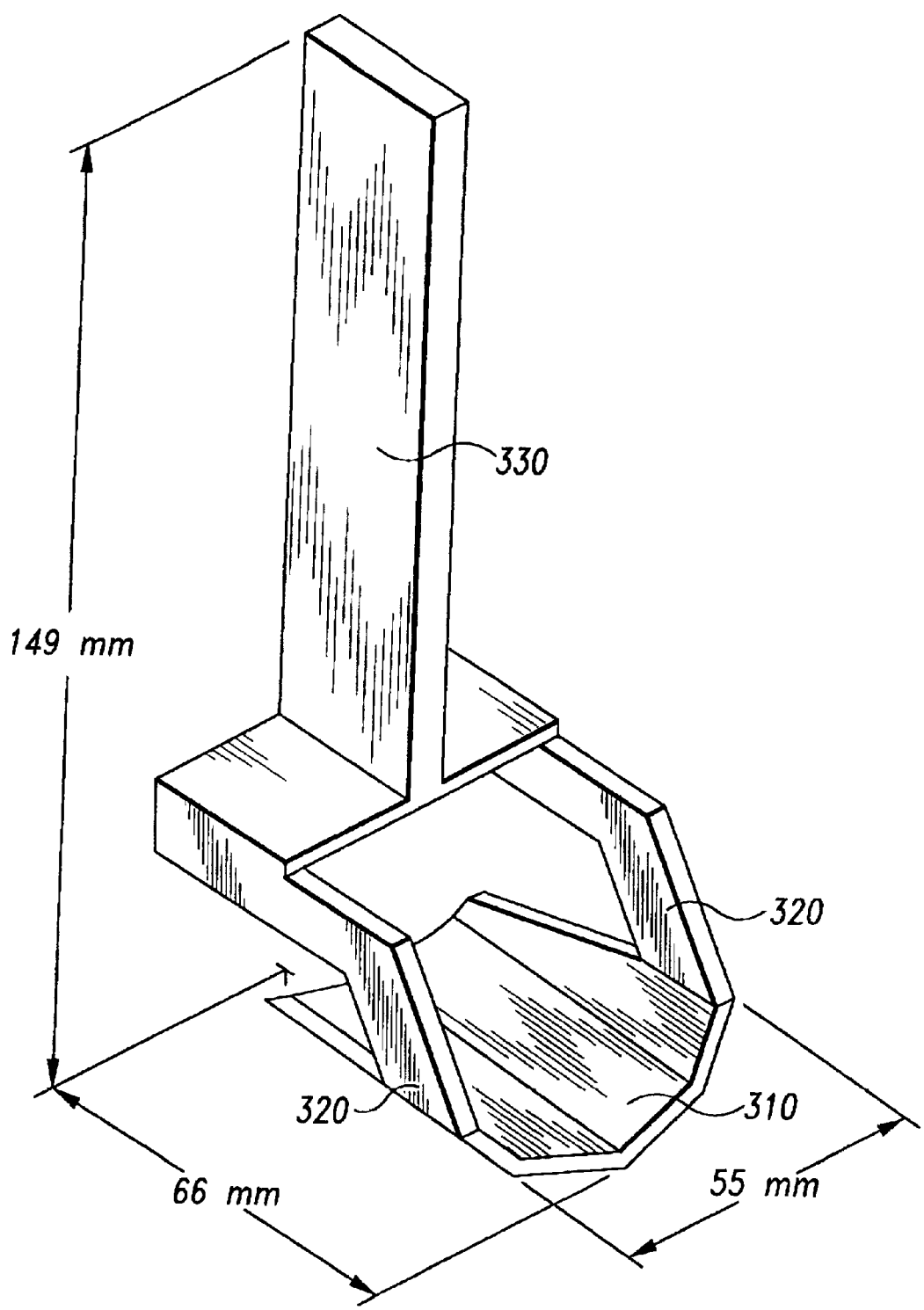
FIG. 3 is a side elevational view of the sampling platform shown in FIG. 1.

Referring now to FIG. 3, further details of the preferred embodiment of sampling platform 210 are illustrated. Sampling platform 210 comprises a tray portion 310, and support portions 320. In the preferred embodiment, tray portion 310 is lower in the middle than on the sides. In another embodiment, tray portion 310 is flat. In one embodiment, tray portion 310 is about 50 mm wide, and less than 66 mm long, relative to the direction of motion. Support portions 320 are affixed to bar 330, which is affixed in turn to shaft 211, so that sampling platform 210 is in mechanical communication with air cylinder 230. In one embodiment, sampling platform 210 is about 150 mm from the top of bar 330 to the bottom of tray portion 310.

In the preferred embodiment, probe 240 is the sensor of an Accumet Model 25 pH meter, which is operable to measure the pH of a soil sample when placed in contact therewith. In order to allow its measurement of the pH of the soil samples to stabilize, the probe must remain in contact with the sample for at least 5 seconds, and preferably for 6 seconds. Collection of the sample and cleaning of the probe between measurements can be accomplished in about 1.5 seconds. Therefore, the preferred period of a measurement cycle is about 8 seconds. As will be readily apparent to those skilled in the art, this permits a range of sampling densities to be used, by varying the speed at which the apparatus 100 is moved.

When measuring soil pH with apparatus 100, adjustably mounted wheels 130 are positioned so that the bottom edge of shank 150 is a distance below the point where wheels 130 contact the ground 131 corresponding to the desired depth of measurement, so that, when apparatus 100 is towed, shank 150 will remove soil above the selected depth forward of probe assembly 110, creating a trench of the selected depth. Removable plate 180 prevents upturned soil from falling back against probe assembly 110, potentially contaminating measurements or otherwise disrupting performance. FIG. 6 is a plan view, illustrating the relative position of shank 150, sampling platform 210, and removable plate 180.

Air cylinder 230 is adapted to actuate sampling platform 210 between at least two positions, including an extended position and a retracted position. In one embodiment, when air pressure is applied to air cylinder 230, sampling platform is moved to the extended position, in which sampling platform 210 is brought into contact with the ground 131, and when air pressure is removed from air cylinder 230, compression in spring 214 returns sampling platform 210 to the retracted position, in which the soil sample is brought into contact with probe 240. In another embodiment, air pressure can be applied in two directions to air cylinder 230, one causing air cylinder 230 to move sampling platform 210 to its extended position, and the other causing air cylinder 230 to move sampling platform 210 to its retracted position. In this embodiment, spring 214 retains sampling platform 210 in an intermediate position when no air pressure is applied. In yet another embodiment, a variable air pressure can be applied to air cylinder 230 so as to cause sampling platform 210 to move to any position intermediate to the extended and retracted positions. Furthermore, those having ordinary skill in the art will recognize that any suitable linear actuator device may be used in place of air cylinder 230, such as a solenoid, stepper motor/lead screw, etc.

Prior to beginning measurement, sampling platform 210 is positioned by turning adjustment piece 220 so that when air cylinder 230 moves sampling platform 210 to its extended position it is 5 mm below the bottom edge of shank 150. The tension in spring 214 is optionally adjusted by turning threaded nut 216. When the apparatus is moving, this will cause soil to be collected on sampling platform 210. Probe 240 is positioned by turning threaded nut 246 so that when sampling platform 210 is moved to its retracted position soil samples contained on the sampling platform 210 are brought into contact with probe 240.

While sampling platform 210 is extended, water is pumped by water pump 167 from tank 160 through hoses 165, and projected through nozzles 250 onto probe 240, so as to remove remnants from the previous measurement which might otherwise contaminate the new sample. Preferably, water is projected under pressure of at least about 100 kPa. By projecting water onto probe 240 while sampling platform 210 is extended, samples are collected simultaneously to cleaning probe 240, minimizing measurement cycle time. The operation of water pump 167 and air cylinder 230 is synchronized by computer 199, which controls the operations of both.

Computer 199 also records the position of apparatus 100 as measured by position measuring devise 190 while sampling platform 210 is in the extended position. The pH measurement of this sample is recorded approximately 6 seconds later, just before the measurement cycle is completed, and is associated in the data storage device with the position of apparatus 100 when the sample was collected. In this way, the pH data is correctly identified with the position in the field from which the soil sample was taken, and not with the position of the apparatus 100 when the measurement is made, which is later in time, when it will have moved some distance from the sample collection location.

Figure 4:
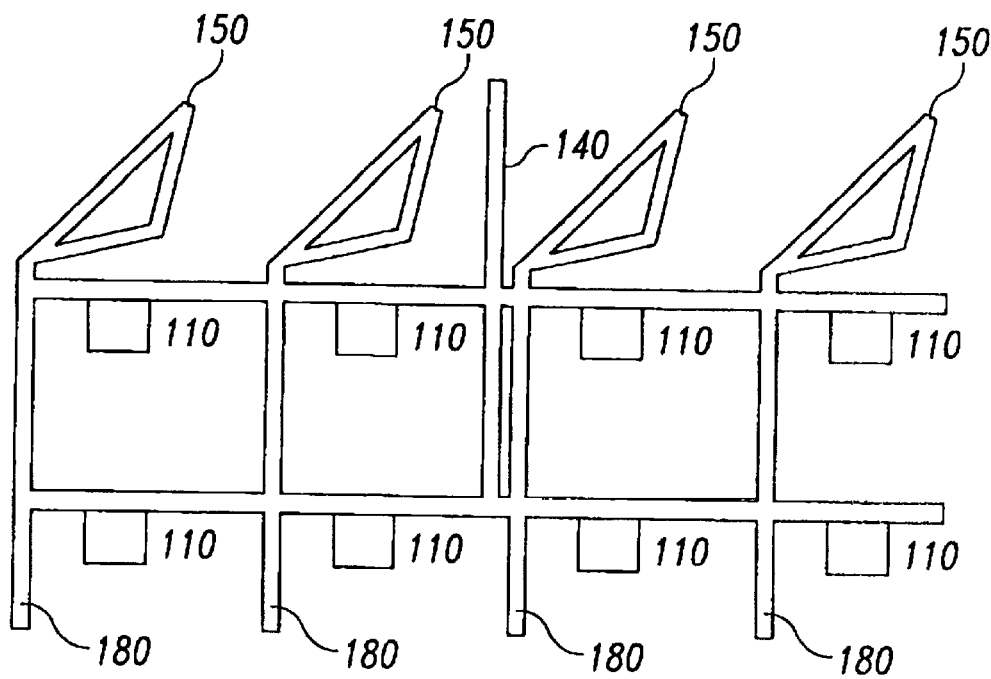
FIG. 4 is a schematic diagram of an apparatus for automatic measurement of soil pH having multiple probe assemblies.

Referring to FIG. 4, an alternative embodiment of an apparatus for automatically measuring soil pH having a plurality of probe assemblies 110 and corresponding shanks 150 and removable plates 180 is shown. As will be readily apparent to those skilled in the art, by placing multiple probes on a single apparatus, a wider strip of field can be measured at a given sampling density, reducing the number of passes needed to measure a given area. Optionally, probe assemblies 110 and shanks 150 are slideably mounted on chassis 120 to permit a variable sampling density. In one embodiment, shanks 150 are independently adjustable, to allow each probe assembly to measure the pH of soil of an independently selected depth. In another embodiment, shanks 150 and probe assemblies 110 are positioned in at least two rows perpendicular to the direction of motion, so that at least two probe assemblies will measure soil from the same strip of soil. In this embodiment, shanks 150 can be adjusted so that shanks in more rearward rows run deeper than those in more forward rows, so that pH measurements can be simultaneously collected for a three dimensional map. In the preferred embodiment, the more rearward rows of probe assemblies can be positioned a distance behind the more forward rows of probe assemblies corresponding to an integral multiple of the sampling interval, such that deeper measurements are made at nearly the same position at which the shallower measurements are made.

Figure 5:
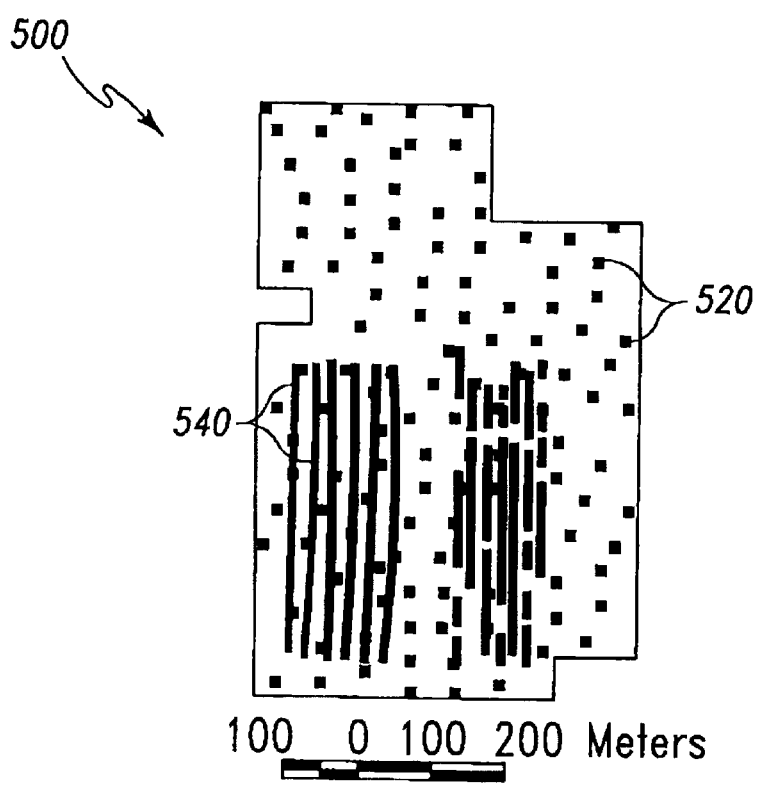
FIG. 5 is a plan view of a field showing the relative positions of pH measurements made according to the standard method and the present invention.

Referring now to FIG. 5, typical sampling densities which can be achieved according to the standard soil mapping methods and the present invention are compared. A field 500 is shown, in which the pH was measured using both the prior art method and the present invention. Manually collected measurements 520 show the positions of data points in a pH map created by the prior art method, wherein the sampling density is one measurement per 0.5 acres. Automatically collected measurements 540 show the positions of measurements made with the apparatus 100 and methods of the present invention, using a single-probe apparatus 100.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. An apparatus for automatically measuring a pH of soil at a relatively large number of places in a field, comprising:
    a chassis having at least one shank extending therefrom for exposing the soil at a desired sampling depth;
    a pH sensor affixed to the chassis;
    at least one probe assembly affixed to the chassis, each of the at least one probe assembly comprising:
        a probe telemetrically connected to the pH sensor;
        a sampling platform for collecting soil from preselected soil depths and bringing it into contact with the probe; and
    a computer telemetrically connected to the pH sensor for collecting and storing data points.

2. An apparatus for automatically measuring a pH of soil at a relatively large number of places in a field, comprising:
    a chassis, comprising:
        a plurality of wheels;
        at least one shank extending from the chassis for exposing the soil at a desired sampling depth; and
        a tank for holding a liquid;
    a pH sensor affixed to the chassis;
    at least one probe assembly affixed to the chassis, each of the at least one probe assembly comprising:
        a probe telemetrically connected to the pH sensor;
        a sampling platform for collecting soil from preselected soil depths and bringing it into contact with the probe;
        an actuator for moving the sampling platform between at least an extended position in which a soil sample is collected and a retracted position in which the soil sample is in contact with the probe; and
        one or more nozzles coupled to the tank of liquid for cleaning the probe between measurements by directing liquid onto the probe; and
    a computer telemetrically connected to the pH sensor for collecting and storing data points.

3. The apparatus of claim 2, further comprising: a first sensor for detecting a location of the apparatus, the first sensor being telemetrically connected to the computer, such that the computer records pH data in the form of data points comprising a pH value of a soil sample and a location of the apparatus when the soil sample was taken.

4. The apparatus of claim 3, wherein the first sensor is a GPS antenna.

5. The apparatus of claim 3, wherein the computer calculates a place from which the soil sample was taken by modifying the location of the apparatus to account for a distance between a position of the sampling platform on the chassis from the location at which the first sensor detects the apparatus.

6. The apparatus of claim 5, further comprising: at least two probe assemblies and at least two shanks, wherein the probe assemblies and shanks are slideably mounted to the chassis to permit at least a transverse distance, relative to a direction of the apparatus' motion, between the probe assemblies and shanks to be adjusted, thereby permitting a sampling density to be varied by adjusting places from which soil samples are collected relative to each other.

7. The apparatus of claim 5, further comprising at least a second sensor for detecting a position of the at least one probe assembly relative to a location of the first sensor, the second sensor being telemetrically connected to the computer, such that the computer adjusts the place recorded for each data point to account for the position of each probe assembly relative to the location detected by the first sensor.

8. The apparatus of claim 5, further comprising at least two probe assemblies and at least two shanks, wherein the probe assemblies and shanks are respectively mounted one behind another relative to a direction of motion of the apparatus when the apparatus is collecting data points, the shanks having depths that are successively deeper from front to rear, to permit measurement of pH at a plurality of depths in a single pass of the apparatus.

9. The apparatus of claim 8, in which a distance between the succeeding probe assemblies is adjustable, so that the distance can be set to an integral multiple of a space between the data points taken by a single probe assembly at a predetermined speed of the apparatus, whereby deeper pH measurements can be made at a substantially same place as that at which shallower measurements were made.

10. The apparatus of claim 9, further comprising a second sensor for detecting a position of each probe assembly relative to a location of the first sensor, the second sensor being telemetrically connected to the computer, wherein the computer automatically adjusts the place recorded for each data point to account for the position of each probe assembly relative to the first sensor.

11. A method for measuring a pH of soil at a plurality of places throughout a field, comprising:
    providing an apparatus comprising:
        a chassis, comprising:
            at least one shank extending from the chassis for exposing the soil at a desired sampling depth;
        a pH sensor affixed to the chassis;
        at least one probe assembly affixed to the chassis, each of the at least one probe assembly comprising:
            a probe telemetrically connected to the pH sensor;
            a sampling platform for collecting soil from preselected soil depths and bringing it into contact with the probe; and
        a computer telemetrically connected to the pH sensor for collecting and storing data points;
    selecting at least one depth at which soil pH measurements will be made and adjusting the apparatus to cause at least one shank to expose the soil at the selected depth or depths;
    selecting a speed corresponding to a desired distance between places for pH measurements; and
    moving the chassis through the field at the selected speed to collect data for a number of places throughout it.

12. A method for creating a relatively high resolution pH map for a field, comprising:
    providing an apparatus comprising:
        a chassis having at least one shank extending therefrom for exposing the soil at a desired sampling depth;
        a pH sensor affixed to the chassis;
        at least one probe assembly affixed to the chassis, each of the at least one probe assembly comprising:

a probe telemetrically connected to the pH sensor;

a sampling platform for collecting soil from preselected soil depths and bringing it into contact with the probe; and a computer telemetrically connected to the pH sensor for collecting and storing data points;

selecting at least one depth at which soil pH measurements will be made;

adjusting the apparatus to cause the at least one shank to expose the soil at the selected at least one depth;

selecting a speed corresponding to a desired distance between locations for pH measurements;

moving the chassis through the field at the selected speed to collect pH data at a number of places throughout the field; and causing the computer to associate the pH data with the respective place from which the soil samples were collected, thereby creating data points in the pH map.

\* \* \* \* \*

UNITED STATES PATENT AND TRADEMARK OFFICE
CERTIFICATE OF CORRECTION

PATENT NO. : 6,356,830 B1
DATED : March 12, 2002
INVENTOR(S) : Viacheslav I. Adamchuk et al.

It is certified that error appears in the above-identified patent and that said Letters Patent is hereby corrected as shown below:

<u>Title page,</u>
Item [75], please change the first inventor's name from "Viacheslav I. Adamchuck" to -- Viacheslav I. Adamchuk --.

Signed and Sealed this

Eleventh Day of June, 2002

*Attest:*

*Attesting Officer*

JAMES E. ROGAN
*Director of the United States Patent and Trademark Office*